(12) United States Patent
Lee et al.

(10) Patent No.: US 8,546,504 B2
(45) Date of Patent: *Oct. 1, 2013

(54) EXTRUSION PROCESSES USING HIGH MELT STRENGTH POLYPROPYLENE

(75) Inventors: Chun Lee, Cincinnati, OH (US); Dinshong Dong, Hockessin, DE (US); Charles S. Holland, Springboro, OH (US); James R. Beren, West Chester, PA (US); Anthony J. De Nicola, Jr., Newark, DE (US); Sameer D. Mehta, Mason, OH (US); Vu A. Dang, Bear, DE (US); Richard J. Fezza, Wilmington, DE (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/024,113

(22) Filed: Feb. 9, 2011

(65) Prior Publication Data

US 2012/0199279 A1 Aug. 9, 2012

(51) Int. Cl.
*C08F 2/00* (2006.01)
*C08L 23/00* (2006.01)

(52) U.S. Cl.
USPC .......................................... 526/236; 524/528

(58) Field of Classification Search
USPC ........................................................ 526/236
See application file for complete search history.

(56) References Cited

U.S. PATENT DOCUMENTS

| 5,266,607 | A | | 11/1993 | Lucas et al. | |
|---|---|---|---|---|---|
| 5,439,949 | A | | 8/1995 | Lucas et al. | |
| 5,508,318 | A | * | 4/1996 | Comer | 522/112 |
| 5,731,362 | A | * | 3/1998 | Scheve et al. | 521/142 |
| 7,339,018 | B2 | * | 3/2008 | Arjunan | 526/336 |
| 2002/0086924 | A1 | | 7/2002 | King, III | |
| 2004/0102550 | A1 | * | 5/2004 | Dang et al. | 524/115 |
| 2010/0168267 | A1 | * | 7/2010 | Dang et al. | 522/75 |

FOREIGN PATENT DOCUMENTS

EP 0634454 A1 1/1995

OTHER PUBLICATIONS

PCT International Search Report and the Written Opinion—Mailed May 16, 2012 for Corresponding PCT/US2012/024244.

* cited by examiner

*Primary Examiner* — Hui Chin

(57) ABSTRACT

The present invention relates to a process comprising extruding a blend of an first propylene polymer comprising a non-phenolic stabilizer and a non-irradiated second propylene polymer, wherein the irradiation of the first propylene polymer was conducted in a reduced oxygen environment, and the irradiated first propylene polymer and the non-irradiated second propylene polymer were blended at a temperature below the melting point of the first and second propylene polymers.

14 Claims, No Drawings

EXTRUSION PROCESSES USING HIGH MELT STRENGTH POLYPROPYLENE

FIELD OF THE INVENTION

The present invention relates to a composition for improved extrusion processes. More particularly, the present invention relates to a blend of irradiated extrudates of polypropylene and non-irradiated polypropylene for use in improved extrusion processes.

BACKGROUND OF THE INVENTION

High melt strength polypropylene has long been used in various extrusion processes for the production of fibers, cast and blown film, pipe and tube extrusion, blow molding and sheet extrusion. In the area of extrusion coating, although traditionally dominated by autoclave LDPE products, where LDPE is blended with propylene homopolymers to improve melt strength, high melt strength polypropylene has also been used where specific properties are required, such as in nonwoven coatings, retortable bricks and metal coating. High melt strength polypropylene has also been used as a blend component with other polypropylenes in extrusion coating, because like LDPE, it possesses a long chain branched structure which is resistant to the elongational shear stress of flat die extrusion. For example, U.S. Pat. No. 5,508,318 discloses compounded blends of irradiated and non-irradiated olefin polymer materials suitable for extrusion coating applications requiring low gloss.

Techniques to improve melt strength in polypropylene have included irradiation of conventional flake polypropylene in reduced-oxygen environments, as described, for example, in U.S. Pat. Nos. 4,916,198, 5,047,485, 5,414,027, 5,541,236, 5,554,668, 5,591,785, 5,731,362, and 5,804,304. These irradiation methods increase propylene polymer melt strength by creating polymer radicals during irradiation which then re-combine to form long-chain branches in the reduced oxygen environment. High melt strength products produced by such methods, e.g., Pro-fax® PF814 and Pro-fax® PF611, have been successfully used commercially.

Conventionally, phenolic antioxidants have long been used to improve polymer stability under elevated temperature conditions, such as those typically experienced during extrusion, or during extended periods of storage. However, their use in irradiated compositions undermines enhanced melt strength by scavenging free radicals, thereby reducing the number of polymeric free radicals available to recombine to form long-chain branches. Moreover, irradiation of phenolic antioxidant-containing polymers can result in the formation of degradation products that impart undesirable color. Non-phenolic stabilizers have been used in the irradiation of conventional polyolefin materials to avoid such problems, as described in U.S. Pat. No. 6,664,317. International Publication No. WO 2009/003930 discloses irradiation of high melt strength polypropylene in the form of pellets containing non-phenolic antioxidants. However, a challenge facing the production of mixtures of conventionally produced high melt strength, where polypropylene flake is irradiated, and other polypropylenes has been that their production requires multiple melt extrusion steps using specialized extruders to homogenize the distribution of high molecular weight material in the overall composition. Moreover, altering the blend ratio of a high melt strength component produced by irradiation and a non-irradiated component to accommodate changing product needs of customers typically requires time consuming reformulation and compounding of the new blend at the polymer manufacturing site. Therefore, for extrusion processes utilizing high melt strength material containing both irradiated and non-irradiated materials, an ongoing need exists for a process that increases manufacturing flexibility, while also maintaining desired product properties. Accordingly, it has unexpectedly been found that extrusion processes using blended mixtures of an irradiated extrudate of polypropylene containing a non-phenolic stabilizer, and a non-irradiated polypropylene, blended below their melting points, provide good product performance while adding flexibility to the manufacturing process.

SUMMARY OF THE INVENTION

The present disclosure relates to a composition made up of a blend of an irradiated first propylene polymer having a non-phenolic stabilizer and a non-irradiated second propylene polymer. The irradiation of the first propylene polymer was conducted in a reduced oxygen environment, and the irradiated first propylene polymer and the non-irradiated second propylene polymer were blended at a temperature below the melting point of the first and second propylene polymers.

In further embodiments, the present disclosure relates to a process of extruding a blend of an irradiated first propylene polymer and a non-irradiated second propylene polymer, where the first propylene polymer comprises a non-phenolic stabilizer. The irradiation of the first propylene polymer is conducted in a reduced oxygen environment, and the irradiated first propylene polymer and the non-irradiated second propylene polymer are blended at a temperature below their respective melting points.

In other embodiments the present disclosure relates to a process of blending an irradiated first propylene polymer comprising a non-phenolic stabilizer, and a non-irradiated second propylene polymer, at a temperature below the melting point of the first and second propylene polymers, thereby forming a polymer blend. The irradiation of the first propylene polymer was conducted in a reduced oxygen environment. The process further includes extruding the polymer blend to form a film and coating the film onto a substrate selected from paper, paperboard, fabrics or metal foils.

In additional embodiments, the present disclosure relates to a process for preparing a polymer composition including blending an irradiated first propylene polymer having a non-phenolic stabilizer with a non-irradiated second propylene polymer, wherein the irradiation of the first propylene polymer was conducted in a reduced oxygen environment. Further, the irradiated first propylene polymer and the non-irradiated second propylene polymer were blended at a temperature below the melting point of the first and second propylene polymers.

DETAILED DESCRIPTION OF THE INVENTION

Propylene Polymer Compositions

The first propylene polymer includes a non-phenolic stabilizer and a propylene polymer selected from:

(a) a crystalline propylene homopolymer having a xylene insolubles greater than 80%, preferably greater than 85%, (b) a crystalline random copolymer comprising propylene and an olefin selected from the group consisting of ethylene and a $C_4$-$C_{10}$ α-olefin, having xylene insolubles greater than 80%, preferably greater than 82%, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight, (c) a crystalline random terpolymer comprising propylene and two olefins selected from the group consisting of ethylene, $C_4$-$C_{10}$ α-olefins, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight; and (d) mixtures thereof.

The second propylene polymer is selected from propylene polymers (a) through (d) as described above for the first propylene polymer, and can be the same or different from the first propylene polymer.

Alternatively, the second propylene polymer can be propylene polymer e) as follows:

e) Propylene polymer material comprising
  (i) about 70 parts to about 90 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%; and
  (ii) about 10 parts to about 30 parts by weight of a copolymer of ethylene and propylene wherein the ethylene content of the copolymer is 30 to 70 wt %.

Accordingly, in some embodiments, the second propylene polymer can be selected from (a) through (d), or (e), or a mixtures thereof.

Preferably, the first and second propylene polymers are independently selected from a crystalline propylene homopolymer, a crystalline random copolymer of propylene and an olefin selected from the group consisting of ethylene and $C_4$-$C_{10}$ α-olefins or mixtures thereof. More preferably, the first propylene polymer is a crystalline propylene homopolymer or a crystalline copolymer of propylene and ethylene. Most preferably, the first propylene polymer is a crystalline propylene homopolymer.

The first propylene polymer preferably has a melt flow rate of 0.1 to 100 dg/min, more preferably 0.15 to 30 dg/min, most preferably 0.2 to 15 dg/min. The second propylene polymer preferably has a melt flow rate of 0.1 to 100 dg/min, more preferably 0.5 to 50 dg/min, most preferably 1 to 35 dg/min. Melt flow rate is determined according to ASTM D1238, measured at 230° C., 2.16 kg, units of dg/min.

The blend of the irradiated extrudate of the first propylene polymer and the non-irradiated second propylene polymer preferably contains 5 to 95 wt % of the irradiated extrudate of the first propylene polymer and 5 to 95 wt % of the non-irradiated second propylene polymer. More preferably, the blend contains 10 to 30 wt % of the irradiated extrudate of the first propylene polymer and 70 to 90 wt % of the non-irradiated second propylene polymer.

The first and second propylene polymers can be prepared by Ziegler-Natta or Single-Site (e.g. metallocene) catalysis.

Non-Phenolic Stabilizers

The non-phenolic stabilizers in the first propylene polymer are selected from hindered amines, hydroxylamines, nitrones, amine oxides, benzofuranones, organic phosphites, phosphonites or mixtures thereof. Non-phenolic stabilizers are described in for example, International Publication No. WO 2009/003930. Preferably, the non-phenolic stabilizers are selected from hindered amines, hydroxylamines, phosphites or mixtures thereof. The non-phenolic stabilizers are typically present in an amount ranging from about 0.001 to about 1 pph, preferably from about 0.005 to about 0.5 pph, and more preferably from about 0.01 to about 0.2 pph.

Processes for Producing the Irradiated Polymer Extrudates

The first propylene polymer to be extruded and irradiated according to the present invention can be produced by a variety of processes, e.g., by combining the propylene polymer and the non-phenolic stabilizer via melt blending, blending below their respective melting points (dry blending), or combinations thereof. Preferably, the first propylene polymer is formed by first dry blending the propylene polymer with the non-phenolic stabilizer, and then extruding the blended material above its melting point. The extrudate produced in the extruder is then subjected to an irradiation treatment. During irradiation, the extrudate can be in the form of a solid, semi-solid or melt. Preferably, the extrudate is a solid, more preferably, the extrudate is in the form of a pellet. Alternative to extruding, the first propylene polymer may be formed into particles, flakes or other forms by casting or other processes known in the art. However, preferably, the first propylene polymer is an extrudate.

The first propylene polymer is irradiated in a reduced oxygen environment, where the total radiation dosage is preferably about 1 to about 20 Megarad, more preferably 2 to 15 Megarad, most preferably 3 to 12 Megarad. The reduced oxygen environment is maintained during irradiation to prevent chain-scission reactions.

The expression "active oxygen" throughout this disclosure refers to oxygen in a form that will react with the propylene polymer composition, and more particularly with free radicals present in the propylene polymer composition, which are produced from the irradiation process. Active oxygen can include, but is not limited to, molecular oxygen, which is the form of oxygen normally found in air.

The expression "reduced oxygen environment" throughout this disclosure means an active oxygen concentration less than about 15% by volume, preferably less than 5% by volume, and more preferably less than 0.004% by volume, with respect to a total volume of the reduced oxygen environment. Most preferably, the reduced oxygen environment is an inert gas selected from nitrogen, argon, helium and krypton. Typically, the reduced oxygen environment is achieved by replacing part or all of the air in the environment in which the irradiation treatment is conducted by an inert gas, either under vacuum or at positive pressures.

The term "rad" is usually defined as a quantity of ionizing radiation that results in an absorption of 100 ergs of energy per gram of irradiated material, regardless of the source of radiation. With regard to the present invention, the amount of energy absorbed by the propylene polymer composition when it is irradiated usually is not determined. However, the process can be carried out such that the energy absorption from the ionizing radiation can be measured by a conventional dosimeter, which is a measuring device comprising a strip of fabric, film, or combination thereof, wherein the strip of fabric, film, or combination thereof comprises a radiation sensitive dye. This radiation-sensitive dye can be used as an energy absorption sensing means. Accordingly, as used throughout this disclosure, the term "rad" means a quantity of ionizing radiation resulting in an absorption of the equivalent of 100 ergs of energy per gram of fabric, film, or combination thereof comprising the radiation sensitive dye of the dosimeter placed at a surface of the propylene polymer composition being irradiated, regardless of the form of the intermediate polyolefin resin at the time of irradiation.

The radiation from the irradiation treatment can be gamma radiation or electron beam radiation, with the radiation preferably being electron beam radiation. Radiation dosage and dosage rates are adjusted to form a substantial amount of chain scission within the propylene polymer composition, so as to achieve a desired change in melt strength while remaining below the gelation point. Typically, the propylene polymer composition is exposed to the requisite dosage of radiation for a time period ranging from about 0.0001 seconds to several days, the period of exposure being based on the desired total radiation dose, radiation dosage rate, and the type of radiation being used. Radiation dosage rates are typically about 1 megarad to about 10,000 megarad per minute, preferably about 18 to about 2,000 megarads per minute.

The radiation should have sufficient energy to penetrate, to the extent desired, the extrudate of the propylene polymer composition, and preferably to excite the atomic structure of the propylene polymer composition, but preferably not sufficient energy to affect atomic nuclei within the intermediate polyolefin composition. Typically, the radiation is formed from electrons being beamed from an electron generator comprising an accelerating potential of 500-10,000 kilovolts.

After the extrudate of the first propylene polymer has been irradiated, it is maintained in the reduced oxygen environment at temperatures of from 20° C. to 110° C. for a period of time sufficient for a significant amount of long chain branches to form within the irradiated first propylene polymer. A minimum amount of time is needed for sufficient migration of the propylene resin chain fragments formed by the irradiation to free radical sites, where they can re-form to complete chains or otherwise form long branches on the polymer chains. Preferably, the irradiated first propylene polymer is maintained in the reduced oxygen environment after exposure to the radiation for about one minute to up to about 48 hours, more preferably, for about one minute to about 24 hours, most preferably 90 minutes to 20 hours.

Following the irradiation treatment, the irradiated extrudate of the first propylene polymer can be subjected to a quenching step while it is in the reduced oxygen environment, to deactivate substantially all free radicals remaining in the irradiated propylene polymer composition. The quenching step includes raising the temperature of the irradiated extrudate of the first propylene polymer, while in the reduced oxygen environment, to temperatures ranging from about 20° C. to about 200° C., more preferably from about 100° C. to about 150° C. Conventional free radical traps, such as methyl mercaptan, can optionally be used during the quenching step.

The irradiation step results in an increase in the melt tension of the irradiated first propylene polymer. Preferably, the melt tension of the irradiated extrudate of the first propylene polymer is greater than 0.5 cN, preferably greater than 1 cN, more preferably, 3.5 to 40 cN, most preferably 20 to 35 cN.

Process for Blending the Irradiated Extrudate and Non-Irradiated Polymer.

The irradiated extrudate of the first propylene polymer is blended with the non-irradiated second propylene polymer below the melting points of both components. Preferably, the blending is performed at room temperature. Blending is conducted in mixing equipment well-known to those skilled in the art, such as a tumble blender, ribbon blender, henschel blender, or by co-feeding irradiated extrudate through loss-in-weight (or gravimetric) feeders at the extruder. In this way, suitable dispersion of the high melt strength material into the non-irradiated material can be obtained without compounding the blend components. Preferably, the blending is conducted by co-feeding irradiated extrudate through loss-in-weight (or gravimetric) feeders at the extruder.

Additives, Stabilizers, and Fillers

The irradiated extrudate of the first propylene polymer can further comprise, in addition to the non-phenolic stabilizer, conventional additives and stabilizers well known in the art. In this regard, the irradiated first propylene polymer can additionally comprise at least one additive, stabilizer, filler, or combination thereof. It will be understood by those in the art that additives is a broad term that encompasses stabilizers and fillers. Additives, stabilizers, and fillers can include, but are not limited to, UV absorbers, metal deactivators, peroxide scavengers, basic co-stabilizers, acid scavengers, pigments, catalysts, optical brighteners, antistatic agents, and mixtures thereof, which can be added in amounts well known to those skilled in the art. However, any additives, stabilizers, fillers, or the like, added to the first propylene polymer should not substantially negatively affect the improved melt tension of the irradiated first propylene polymer described in the present invention. In particular, the total amount of any phenolic stabilizers present in the irradiated extrudate of the first propylene polymer is at most 500 ppm based on the polymer, more preferably less than 150 ppm, more preferably less than 100 ppm, and more preferably less than 50 ppm. Most preferably, the irradiated extrudate of the first propylene polymer is free of phenolic stabilizers.

Extrusion Processes

The extrusion processes of the invention include those well-known to those skilled in the art, such as extrusion to form fibers, cast or blown film; sheet extrusion, profile extrusion, pipe and tube extrusion, extrusion blow molding and extrusion coating. Preferably, the extrusion process is extrusion blow molding or extrusion coating. Most preferably, the extrusion process is extrusion coating. Extrusion coating applications are especially demanding, and benefit from compositions which provide a balance of maximum line speed, reduced coating thickness and neck-in of the extruded coating, color, and the film appearance.

Test Methods

Unless otherwise specified, the properties of the polymer materials and compositions that are set forth in the following examples have been determined according to the following test methods:

Melt Flow Rate ("MFR")

ASTM D1238, measured at 230° C., 2.16 kg, units of dg/min.

Film Quality

Film quality is measured by visually evaluating the films relative to the following criteria:

"Poor:" Film has sand paper texture, non-uniform appearance and numerous gels.

"Fair:" Film is smooth, with some areas of non-uniform appearance, and with some gels present.

"Good:" Film is smooth, with uniform appearance and few gels.

"Excellent:" Film is smooth, with uniform appearance and no visual gels present.

Melt Tension ("MT")

Melt tension is measured on a Goettfert Rheotens apparatus at 200° C. The Rheoten apparatus consists of two counter-rotating wheels mounted on a balance beam. A melt strand of the polymer is extruded from a capillary die and pulled between the counter-rotating wheels until the strand ruptures. The pulling velocity of the counter-rotating wheels is initially constant to establish a baseline of force, with a constant acceleration then applied to the strand until the strand ruptures. The maximum force measured before rupture during the test is taken as the melt tension. The extensibility of the melt is represented by the velocity at rupture.

Xylene Insolubles ("XI")

The weight percent of polymer soluble in xylene at room temperature is determined by placing 2.5 g of polymer in 250 ml of xylene at room temperature in a vessel equipped with a stirrer, and heating at 135° C. with agitation for 20 minutes to dissolve the whole polymer. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached.

Yellowness Index ("YI")

The Yellowness index ("YI") is measured according to ASTM D1925-70.

Film Neck-In

Film neck-in, i.e., the difference between the width of the extrusion die opening and the width of the coating on the substrate, was measured with a ruler on the paper-coated film.

Components

The following components are used in the Examples disclosed herewith:

Pro-fax® 6323, Pro-fax® 6331, are non-irradiated polypropylene homopolymers commercially available from Equistar Chemicals, LP.

Pro-fax® PF611 and Pro-fax® PF814 are irradiated polypropylene homopolymers.

Pro-fax® 7823, a commercially available non-irradiated heterophasic propylene copolymer from Equistar Chemicals, LP.

Irganox 1330 is a sterically hindered phenolic antioxidant ("3,3',3',5,5',5'-hexa-tert-butyl-a,a',a'-(mesitylene-2,4, 6-triyl)tri-p-cresol") commercially available from BASF.

Chimassorb 944 is a hindered amine stabilizer commercially available from BASF.

Irgastab FS-042 a hydroxylamine commercially available from BASF.

DHT-4A is a stabilizer comprised of Hydrotalcite available from Kyowa chemical industry.

EXAMPLES

The following examples are illustrative of preferred processes and are not intended to be limitations thereon. All references to parts, percentages and ratios in this specification refer to percentages by weight of the final composition prepared, and unless otherwise indicated, all totals equal 100% by weight.

Control Example 1

An extrusion-coated film was prepared from a non-irradiated polypropylene homopolymer having an MFR of 20 dg/min and a XI of 95%. The homopolymer was produced by first prepolymerizing propylene with a catalyst commercially available from Equistar Chemicals, LP with propylene, where the yield of pre-polymerized catalyst was about 10-20 g/g-catalyst. The pre-polymerized catalyst and propylene were then continuously fed into a first loop reactor. The homopolymer formed in the first loop reactor and propylene were fed to a second reactor. The temperature of both loop reactors was between 71-73° C. The polymer was discharged from the second reactor, separated from the unreacted monomer and dried. The dried polymer was compounded with 0.07 pph of Irganox 1330 and 0.05 pph of DHT-4A, above their melting points, and then extrusion-coated onto 4 mil Craft paper using a 4.5-inch, 24:1 L/D, 150-horsepower Beloit single screw extruder with coat hanger type die at a web width of 30 inches. Conditions for the extrusion coating: line speed in feet-per-minute (fpm), die opening, air gap size, die temperature and chill roll type, as well as the film properties, are summarized in Table 1.

Control Example 2

An extrusion-coated film was prepared as in Control Example 1 with Pro-fax® PF611, a propylene polymer having an MFR of 30 dg/min, containing 20 wt % of a high melt strength polypropylene homopolymer having a melt tension of 20 cN. Extrusion conditions and film properties are summarized in Table 1.

Example 3

An extrusion-coated film was prepared as in Control Example 1 from a polymer composition containing 85 wt % of Pro-fax® 6323, a non-irradiated propylene homopolymer, having an MFR of 12 dg/min. and an XI of 95 wt %, and 15 wt % of an irradiated extrudate. The irradiated extrudate was prepared from a propylene homopolymer having an MFR of 0.14 dg/min and XI of 97.8 compounded with 0.1 part per hundred ("pph") of Chimassorb 944, and 0.03 pph of calcium stearate, on a JSW extruder to form an extrudate with a melt flow rate of 0.6 dg/min. The extrudate was irradiated in an inert atmosphere, and then thermally treated at 80° C. for 1.5 hours and at 140° C. for an additional 1.5 hrs. The melt tension of the irradiated extrudate was 34 cN and the MFR was 1.7 dg/min. The polymer composition was formed by dry blending the irradiated and non-irradiated materials below their melting point in a drum blender. Extrusion conditions and film properties are summarized in Table 1.

Control Examples 1 and 2, and Example 3 illustrate that the process of the invention for producing films provides a superior balance of maximum line speed, reduced coating thickness and neck-in, and good color and film appearance without having to compound the material above its melting point, as in conventionally produced materials.

Example 4

An extrusion-coated film was prepared as in Example 3, except that the non-irradiated propylene homopolymer was Pro-fax® 6331, having an XI of 95.0 wt % and an MFR of 12 dg/min. Extrusion conditions and film properties are summarized in Table 1.

Comparative Example 5

An extrusion-coated film was prepared as in Example 4, except that Pro-fax® 6331 and the irradiated polymer material were blended by compounding them above their melting point. Extrusion conditions and film properties are summarized in Table 1.

Example 4 and Comparative Example 5 demonstrate that the process of the invention provides comparable film performance to conventional processes where irradiated, high melt strength material is melt blended with a non-irradiated material, without the need to compound the blend components.

Control Example 6

An extrusion-coated film was prepared as in Control Example 1 from 15 wt % of Pro-fax® PF814, a high melt strength propylene homopolymer, having a melt tension of 28 cN and MFR of 2.8 dg/min., and 85 wt % of Pro-fax® PH835, a propylene homopolymer having an MFR of 34 dg/min and an XI of 96 wt %. The polymer composition was formed by dry blending the irradiated and non-irradiated materials in a drum blender. Extrusion conditions and film properties are summarized in Table 1. Extrusion conditions and film properties are summarized in Table 1.

Example 7

An extrusion-coated film was prepared as in Control Example 6 except that instead of Pro-fax® PF814, an irradiated extrudate was used. The irradiated extrudate was prepared from a propylene homopolymer having an MFR of 0.14 dg/min and XI of 97.8 wt % compounded above its melting point with 0.1 part per hundred ("pph") of Chimassorb 944, and 0.03 pph of calcium stearate, in a David Standard 2.5" single screw extruder to form an extrudate with a melt flow rate of 1.5 dg/min. The extrudate was irradiated in an inert atmosphere, and then thermally treated at 80° C. for 1.5 hours and at 140° C. for an additional 1.5 hrs. The melt tension of the irradiated extrudate was 20 cN and the MFR was 3.5 dg/min. The polymer composition was formed by dry blending the irradiated and non-irradiated materials in a drum blender. Extrusion conditions and film properties are summarized in Table 1. Extrusion conditions and film properties are summarized in Table 1.

Control Example 6 and Example 7 demonstrate that dry blends of high melt strength irradiated extrudates and non-irradiated material provide films with improved qualities relative to dry blends of the same non-irradiated material with commercially available high melt strength material produced by irradiating flake material. This results from improved dispersion of the high melt strength material in the blend with the non-irradiated material.

Comparative Example 8

A propylene homopolymer commercially available Equistar Chemicals, LP having an MFR of 0.15 dg/min and XI of 95.6% was dry blended with an additive package of 0.05 pph of FS-042, 0.05 pph Chimasorb 944 and 0.03 pph of calcium stearate. The blend was compounded in a ZSK-92 extruder above its melting point at 230° C. to provide an extrudate with an MFR of 0.3 dg/min. The extrudate was irradiated in an inert atmosphere. After irradiation, the irradiated pellet was treated at 80° C. for 90 min. and then at 140° C. for an additional 90 minutes under an inert atmosphere. The irradiated material had a melt flow of 2.3 dg/min and a melt tension of 20 cN.

The irradiated material was blended with Pro-fax® 7823, a commercially available non-irradiated heterophasic propylene copolymer with a mfr of 0.5 dg/min and XI of 88%, containing 85.6 wt % propylene homopolymer impact modified with 14.4 wt % of an ethylene/propylene rubber. The total polymerized ethylene content of the composition is 9.4 wt %.

The blend ratio used was 20 wt % irradiated material, 80 wt % non-irradiated material. The extrudate was processed in a Bekum BA34.2 blow molding machine at various melt temperatures running in continuous extrusion mode, to form a parison. The die gap was set at 4 mm, and the continuous throughput was set at 36 kg/hr. After formation of the parison, a knife cut the parison near the die. The time required for the (stretching) parison to reach 1140 mm from the die was measured as the parison hang time. Parison hang time as a function of melt temperature is shown in Table 2.

Example 9

A polymer blend was prepared as in Comparative Example 8 except that the irradiated and non-irradiated polymers were dry-blended below their melting points. A parison was

TABLE 1

| | Control Ex. 1 | Control Ex. 2. | Ex. 3 | Ex. 4 | Comp. Ex. 5 | Control Ex. 6 | Ex. 7 |
|---|---|---|---|---|---|---|---|
| Die opening, mil | 25 | 25 | 25 | 25 | 25 | 25 | 25 |
| Coating thickness, mil | 1 | 1 | 1 | 1 | 1 | | |
| Air Gap, inch | 6 | 7 | 7 | 7 | 7 | 7 | 7 |
| Die Temp., ° F. | 590 | 590 | 590 | 590 | 590 | 590 | 590 |
| Line speed, fpm | | 1200 | 1200 | 1200 | 1200 | | |
| Roll type | Textured | Textured | Textured | Textured | Textured | Textured | Textured |
| Film appearance | Good | Good | Good | Good | Good | Fair | Excellent |
| Neck-in, inch | | 6.6 | 7.4 | 7.5 | 7.3 | | |
| YI | | 10.6 | −0.4 | | | | |
| Max line speed, fpm | 800 | 2000+ | 2000+ | 2000+ | 2000+ | 1500+ | 1500/1000 |
| Neck-in (at max speed), inch | 12.5 | 6.9 | 8 | 8 | 8.25 | 7.5 | —/10.25 |
| Coating thickness (at max speed), mil | 1 | 0.5 | 0.5 | 0.5 | 0.5 | 0.5 | 1/0.5 | formed and hang time measured as in Control Example 9. Parison hang time as a function of melt temperature is shown in Table 2.

TABLE 2

| | Parison Hang Time, seconds | |
|---|---|---|
| Temperature | Comparative Example 8 | Example 9 |
| 200° C. | 74 | 117 |
| 220° C. | 71 | 107 |
| 240° C. | 65 | 93 |

Table 2 illustrates that the propylene polymer materials prepared by blending irradiated polymer extrudates with non-irradiated materials below their melting points results in parisons produced by extrusion blow molding having superior hang time properties relative to the same blend made by melt extruding the blend components.

All incorporations by reference throughout this disclosure are done within the spirit and scope of the disclosure herein, and are not meant to limit the disclosure or scope of the following claims.

Additionally, the present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:

1. A process comprising extruding a blend of an irradiated first propylene polymer comprising a non-phenolic stabilizer and a non-irradiated second propylene polymer,
    wherein the irradiation of the first propylene polymer was conducted in the presence of oxygen, and
    the irradiated first propylene polymer and the non-irradiated second propylene polymer were blended at a temperature below the melting point of the first and second propylene polymers.

2. The process of claim 1 wherein the blend is extruded to form a film.

3. The process of claim 2 further comprising coating the film onto a substrate.

4. The process of claim 1 wherein the blend is extruded in an extrusion blow molding process.

5. The process of claim 1 wherein the blend comprises 5 to 95 wt % of the irradiated extrudate of the first propylene polymer and 5 to 95 wt % of the non-irradiated second propylene polymer.

6. The process of claim 1 wherein the melt flow rate of the first propylene polymer is 1 dg/min to 15 dg/min and the melt flow rate of the second propylene polymer is 1 dg/min to 35 dg/min.

7. The process of claim 1 wherein the first propylene polymer is selected from:
    (a) a crystalline propylene homopolymer having a xylene insolubles greater than 80%,
    (b) a crystalline random copolymer comprising propylene and an olefin selected from the group consisting of ethylene and a $C_4$-$C_{10}$ α-olefin, having xylene insolubles greater than 80%, with the proviso that when the α-olefin is ethylene, the crystalline random copolymer comprises a maximum polymerized ethylene content of about 10% by weight, and when the α-olefin is a $C_4$-$C_{10}$ α-olefin, the crystalline random copolymer comprises a maximum polymerized α-olefin content of about 20% by weight,
    (c) a crystalline random terpolymer comprising propylene and two olefins selected from the group consisting of ethylene, $C_4$-$C_{10}$ α-olefin, and mixtures thereof with the proviso that the crystalline random terpolymer comprises a maximum polymerized $C_4$-$C_{10}$ α-olefin content of about 20% by weight, and when at least one of the α-olefins is ethylene, the crystalline random terpolymer comprises a maximum polymerized ethylene content of about 5% by weight, and
    (d) mixtures thereof.

8. The process of claim 1 wherein the second propylene polymer is selected from crystalline propylene homopolymers, crystalline random copolymers comprising propylene and an olefin selected from ethylene, $C_4$-$C_{10}$ α-olefins or mixtures thereof.

9. The process of claim 8 wherein 70 to 90 wt % of the second propylene polymer and 10 to 30 wt % of the irradiated extrudate of the first propylene polymer composition are blended.

10. The process of claim 1 wherein the second propylene polymer is:
    e) a propylene polymer material comprising
        (i) about 70 parts to about 90 parts by weight of a crystalline propylene homopolymer having xylene insolubles of at least 80%, or a crystalline copolymer selected from the group consisting of (a) propylene and ethylene, (b) propylene, ethylene and a $C_4$-$C_{10}$ α-olefin, and (c) propylene and a $C_4$-$C_{10}$ α-olefin, the crystalline copolymer comprising a propylene content of more than about 85% by weight, and xylene insolubles greater than about 60%; and
        (ii) about 10 parts to about 30 parts by weight of a copolymer of ethylene and propylene wherein the ethylene content of the copolymer is 30 to 70 wt %.

11. The process of claim 1 wherein the non-phenolic stabilizer is selected from hindered amines, hydroxylamines, phosphites or mixtures thereof.

12. The process of claim 11 wherein the non-phenolic stabilizer is present in an amount from about 0.005 to about 0.5 pph.

13. A process comprising:
    blending an irradiated first propylene polymer comprising a non-phenolic stabilizer, and a non-irradiated second propylene polymer, at a temperature below the melting point of the first and second propylene polymers, thereby forming a polymer blend,
    wherein the irradiation of the first propylene polymer was conducted in the presence of oxygen;
    extruding the polymer blend to form a film; and
    coating the film onto a substrate selected from paper, paperboard, fabrics or metal foils.

14. A process for preparing a polymer composition comprising:
    blending an irradiated first propylene polymer comprising a non-phenolic stabilizer with a non-irradiated second propylene polymer,
    wherein the irradiation of the first propylene polymer was conducted in the presence of oxygen,
    wherein the irradiated first propylene polymer and the non-irradiated second propylene polymer were blended at a temperature below the melting point of the first and second propylene polymers.

* * * * *